United States Patent Office 2,776,568
Patented Jan. 8, 1957

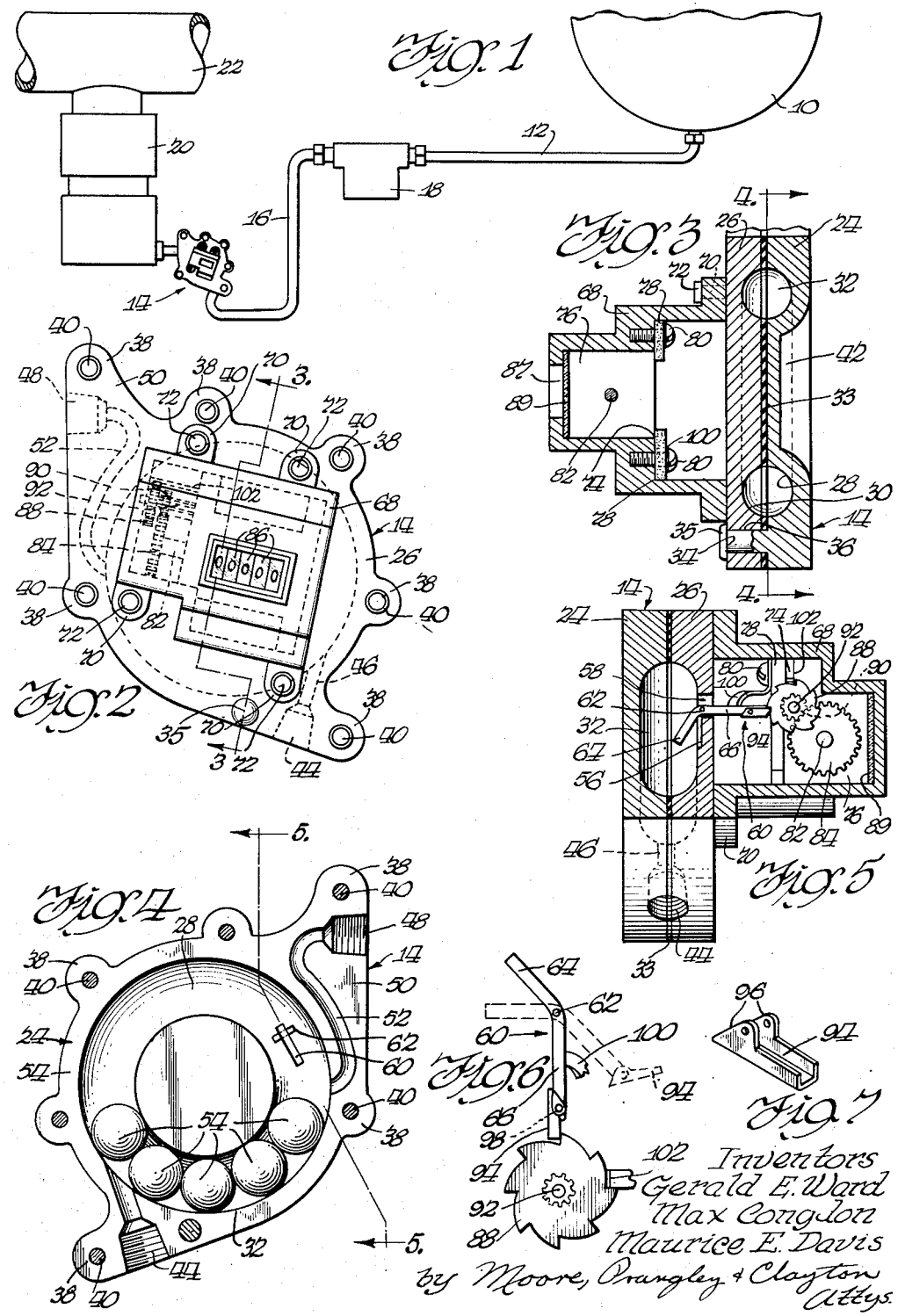

2,776,568

FLUID METERING DEVICE

Gerald E. Ward, Chicago, Ill., and Max Congdon, Zeeland, and Maurice E. Davis, Holland, Mich.

Application April 19, 1954, Serial No. 424,192

5 Claims. (Cl. 73—255)

This invention is concerned with a meter for measuring the consumption of liquid fuel such as gasoline.

In long trucking hauls a considerable quantity of gasoline or other fuel is burned. The cost of such fuel often adds up to a considerable sum and fairly minor variations in the total may spell the difference between economic success and failure. Significant variations in the total amount of fuel used may be introduced by an inherently inefficient truck, by an improperly adjusted engine, or by a dishonest driver. Therefore, it is most important that the exact amount of fuel being burned by the engine be known.

An object of this invention is to provide a new or improved meter for measuring the flow of gasoline or the like.

Another object of this invention is to provide a totalizing meter for measuring the flow of gasoline or the like in which the registering device cannot be locked without blocking the flow of gasoline or the like.

Another object of this invention is to provide a meter for measuring the flow of gasoline or the like which cannot be operated reversely to give false readings.

A further object of this invention is to provide a fluid flow measuring meter utilizing a conventional, commercially available counter as a totalizer.

Another object is to eliminate extra fuel storage tanks and thereby to increase payload by allowing a driver to stop for fuel as needed rather than only at prearranged places.

Other and further objects and advantages will be apparent from the following description when taken in connection with the accompanying drawings wherein:

Fig. 1 is a somewhat diagrammatic view showing our meter installed between a gasoline tank and the carburetor of a gasoline engine;

Fig. 2 is a side elevational view of our meter as positioned in installed operative position;

Fig. 3 is a cross-sectional view substantially as seen in the direction of the arrows along the line 3—3 of Fig. 2;

Fig. 4 is a cross-sectional view substantially as seen in the direction of the arrows along the line 4—4 of Fig. 3;

Fig. 5 is a cross-sectional view substantially along the line of 5—5 of Fig. 4;

Fig. 6 is an enlarged end view of the counter actuating mechanism; and

Fig. 7 is an enlarged perspective view of the one-way actuator.

With reference first to Fig. 1 there will be seen a gasoline tank indicated diagrammatically at 10. A fuel line 12 leads from the tank 10 to the fuel pump 18, and another fuel line 16 leads from there to our meter 14. Gasoline passes from the meter 14 to a carburetor 20 and then to an intake manifold 22. All of the gasoline passing from the tank 10 to the carburetor 20 must pass through the meter 14 and all of the gasoline passing through the meter is totalized by a counting mechanism in the meter.

The meter 14 as seen best in Figs. 2–5 comprises two substantially similar sections 24 and 26 hereinafter referred to as the base and the cover respectively. Both of the sections 24, 26 are basically circular in outline and preferably are cast of metal not readily corroded by the gasoline or other fuel, although the sections may be formed in other ways from different materials. The base 24 is formed with a ring-like groove 28 which is semicircular in cross section and the cover 26 is formed with a similar ring-like groove 30 likewise semicircular in cross section. The grooves fit together to form a toroidal channel or flow passage 32. A gasket 33 preferably is placed between the base 24 and cover 26 to prevent leaking from the toroidal channel 32 as will be apparent. The medial plane of the toroidal channel 32 as defined by the mating faces of base 24 and cover 26 is normally positioned generally vertically in the installed position as illustrated in the drawing. The sections 24 and 26 readily may be aligned by means of a pin 34 which may be formed integral with the base 24 and which fits into an aperture 36 in the cover 26. The portion of pin 34 extending beyond cover 26 is peened over as at 35 whereby permanently to join sections 24 and 26 in a permanent manner to prevent positively any tampering with the meter or counter to be described hereinafter. The base 24 and cover 26 are provided with ears or bosses 38 for receipt of fastening members to secure the base and cover together. The fastening members preferably comprise hollow ended studs 40 formed integral with the base 24. The studs 40 extend through apertures in the cover 26 and are also peened over to hold the cover and base together. As may be seen in Fig. 3 the central portion of the base 24 preferably is relieved at 42 in order to conserve material and to reduce the weight of the meter.

The base and cover 24 and 26 further are provided with relieved portions cooperating to form a threaded inlet connection 44 leading through a restricted channel 46 substantially tangentially to the toroidal channel 32. A similar threaded outlet connection 48 is formed in enlarged portions 50 of the base 24 and cover 26. A curved outlet passage 52 formed in the confronting faces of the base 24 and cover 26 extends from the outlet connection 48 to the toroidal channel 32 which it enters at substantially right angles. As clearly shown in Fig. 2, the outlet 48 when the meter is installed is disposed above the top of the channel 32 so that fuel is prevented from draining out of the meter during periods when the motor is idle. If such draining were permitted, inaccuracies in the meter readings would be introduced. The inlet 44 is positioned at the bottom of the meter when the meter is in operative position.

A plurality of metallic balls 54, five in the illustrative embodiment, is positioned in the toroidal channel 32. The balls are just slightly smaller in cross section than is the toroidal channel 32 so that gasoline or other fuel passing through the meter cannot readily pass past the balls in the channel with the result that the balls are pushed around the toroidal channel by the flowing fuel, it being understood that the balls roll readily in the channel. The balls are made of corrosion-resistant material which, for example, may be stainless steel. The balls occupy a greater arcuate extent of the toroidal channel than the short arc between the inlet passage 46 and the outlet passage 52.

The meter is mounted in the position shown in Fig. 2 so that one ball always comes to rest in front of and above the inlet passage 46 as shown in Fig. 4, the inlet being positioned between two of the balls 54. Gasoline entering inlet 44 collects beneath the left hand ball 54 as viewed in Fig. 4 and the pressure of the gasoline lifts and carries the ball 54 around the toroidal groove 28 in a clockwise direction. After the ball reaches the uppermost point in groove 28 the ball falls under the influence of gravity and the pressure of the gasoline across a counter-actuator (to be described hereinafter) to actuate the counter-mechanism that will be described later. The remaining balls meanwhile have been shifted by gravity until they lie in the lowermost portion of groove 58 and as soon as the ball that has gone around groove 28 reaches the lower portion of the groove, all of the balls are again shifted to the position shown in Fig. 4. This permits the gasoline which moved the ball to escape through outlet 52 and thence to the carborator. It will be seen that the next quantity of gasoline will pick up the new left hand ball and the operation described above will be repeated.

The cover 26 is provided with a groove 56 (Fig. 5) in the face of the channel 32 and a slot 58 having relieved edges extends outwardly therefrom through the face of the cover 26. A ratchet lever 60 passes through the slot 58 and is pivoted on a pin 62 extending transversely through the slot 58. The ratchet lever 60 is provided with angularly disposed arms 64 and 66, the former of which is adapted to be pressed flat into the groove 56 as the balls roll over it.

A hollow meter casing 68 is provided with laterally extending lugs 70 through which studs 72 integral with the cover 26 are passed and peened over to secure the casing to the cover, a gasket preferably being interposed between the casing and cover to provide a fluid tight seal between the two. The casing 68 is provided with interior shelves or shoulders 74, and a counter 76 fits between the shelves or shoulders 74 with laterally extending flanges 78 on the counter resting on the shelves or shoulders 74. Screws 80 pass through the flanges 78 and are threaded into the casing 68 to secure the counter 76 in position. The counter is of conventional construction available commercially and is provided with an actuating shaft 82 carrying a pinion gear 84. The counter contains a plurality of cylindrical dials 86 (Fig. 2) numbered from "0" through "9" and these dials rotate in predetermined sequence and at predetermined rates to indicate a function of the number of revolutions of the pinion gear 84 and shaft 82. The dials are readable through an opening 87 in the casing 68 and may be protected by a glass window 89.

A ratchet wheel 88 is fixed on a spline 90 rotatable on a shaft 92 with the ratchet wheel in close proximity with the pinion gear 84 and with the spline 90 meshing with the pinion gear 84.

A trip lever 94 (see particularly Figs. 6 and 7) is pivotally mounted on the extremity of the arm 66 of the ratchet lever 60. The trip lever 94 is formed of sheet metal and is of substantially channel shape. A pair of ears 96 on the trip lever 94 embraces the arm 66 of a ratchet lever 60 and the ears are pivoted thereon. The end of the arm 66 is beveled at 98 to allow limited counterclockwise turning of the trip lever 94 about its pivot. A curved leaf spring 100 (Figs. 5 and 6) extends from beneath the head of one of the screws 80 and bears against the arm 66 so as normally to urge the ratchet lever 60 to its limit of clockwise movement as determined by the slot 58. As each ball falls past the lever 60 in a clockwise direction as seen in Fig. 4, it forces the arm 64 down into the groove 66 and the ratchet lever pivots in a counterclockwise direction to cause the trip lever 94 to engage the ratchet wheel 88 and thus to rotate the ratchet wheel clockwise the distance of one tooth. A leaf spring 102 (Figs. 2, 5, and 6) extends from between one of the flanges 78 of the counter and its supporting shelf 74 and bears against the ratchet wheel 88 to insure proper stepwise movement of the ratchet wheel while preventing accidental retrograde movement.

After each ball has passed the lever arm 64 in a positive direction the spring 100 forces the ratchet lever 60 back in a clockwise direction from the dotted line position shown in Fig. 6 to the full line position. The trip lever 94 is free to pivot counterclockwise to the dotted line position shown in Fig. 6 and does pivot to this position as it engages a tooth of the ratchet wheel 88 while the lever 60 is pivoting clockwise. The ratchet lever 60 and trip lever 94 thus are in position to trip the ratchet wheel and rotate it clockwise a distance equal to another tooth as the next ball rolls over the arm 64 in a positive direction.

If anything jams the counting mechanism or otherwise precludes counterclockwise pivoting of the ratchet lever 60, then the balls will be stopped and will so nearly completely obstruct the toroidal channel 32 as to preclude passage of gasoline therethrough, thus preventing spurious readings. If any forces tend to send the balls 54 through the channel 32 in a reverse direction the first ball to encounter the arm 64 will be stopped by this arm as the lever 60 cannot pivot clockwise beyond a certain point. The meter thus cannot be operated reversely to give rise to false readings.

The assembly of the meter by means of the peened over studs 34, 40 and 72 positively prevents disassembly of the meter without detection and there is no need for additional sealing means.

This application is a continuation in part of application Serial No. 277,274 filed March 18, 1952 for Metering Device, now abandoned.

Although a particular embodiment of the invention has been shown and described, it will be apparent that this is for illustrative purposes only and that various changes can be made in the structure without departing from the spirit and scope of the invention as expressed in the appended claims.

We claim:

1. A fluid metering device comprising a body having a toroidal flow channel formed therein, said body having a fluid inlet to said toroidal flow channel and a fluid outlet from said toroidal flow channel, a plurality of balls in said channel and adapted to be moved therethrough by fluid flowing through said channel, fluid flow indicating means mounted on said body, there being an opening in said body and communicating with said channel, a lever pivoted in said opening and having a pair of arms, one of said arms extending diagonally into said channel and adapted to be moved by balls moving in one direction, means preventing movement of said lever by balls moving in the opposite direction, a trip lever comprising a channel member, means pivotally mounting said trip lever on the second arm of said previously mentioned lever with an end portion of said trip lever embracing said second arm so that the trip lever has substantially free pivotal movement in one direction and limited pivotal movement in the other direction, a ratchet wheel rotatably mounted for movement by said trip lever when said first mentioned lever in pivoted by said balls, said trip lever pivoting for free passage past said ratchet wheel on return movement of said first mentioned lever, and means linking said ratchet wheel to said indicating means for controlling said indicating means.

2. A fluid metering device comprising a body having a toroidal flow channel formed therein having the medial plane thereof generally vertically disposed, said flow channel having a predetermined inside diameter, said body having therein a fluid inlet extending substantially tangentially and upwardly into a lower portion of said toroidal flow channel and a fluid outlet from said flow channel and spaced arcuately from said fluid inlet, a plurality of spherical balls contained in said toroidal flow channel, said balls having an outside diameter just slightly less than said predetermined internal diameter of said flow channel whereby said balls are moved through said channel by fluid flowing therethrough, said balls together occupying an arc of said channel greater than the short arc of said channel between said fluid inlet and said fluid outlet, there being a lateral opening formed in said body and communicating with said flow channel, a ratchet lever pivotally mounted in said opening and extending into said flow channel, said ratchet lever being substantially freely pivotal in one direction to allow balls to pass in one direction and being limited in pivoted movement to stop balls tending to pass in the opposite direction, a trip lever comprising a channel member partially embracing and pivotally mounted on the free end of said ratchet lever externally of said channel, means limiting pivotal movement of said trip lever in one direction and allowing substantially free pivotal movement in the opposite direction, a ratchet wheel rotatable by said trip lever as said ratchet lever is pivoted by said spherical balls, said trip lever pivoting freely past said ratchet wheel as said ratchet lever returns in the opposite direction, a counting device, and means including gear means for operating said counting device in response to rotation of said ratchet wheel.

3. A fluid metering device comprising a pair of body members having registering channel portions defining a toroidal flow channel, one of said body members having a plurality of apertures extending therethrough, the other of said body members having a plurality of integral studs, each of said studs extending through one of said apertures, the free ends of said studs being peened over for securely holding said body members together, said body members having formed therein a fluid inlet to said flow channel and a fluid outlet from said flow channel, a plurality of balls in said channel and adapted to be moved therethrough by fluid flowing through the channel, fluid flow indicating means, means extending into said channel and adapted to be actuated by said balls to control said indicating means, and housing means for said indicating means, said housing means having a plurality of apertures therethrough, and one of said body members having integral studs extending through the apertures in said housing means, the free ends of said last mentioned studs being peened over for securely retaining said housing means.

4. A fluid metering device comprising a body member having formed therein a toroidal flow channel, said body member also having formed therein a fluid inlet to said flow channel and a fluid outlet from said flow channel, a plurality of balls contained in said channel and adapted to be moved therethrough by fluid flowing through the channel, fluid flow indicating means, means actuated by movement of said balls for controlling said indicating means, a housing for enclosing said indicating means, said housing having a plurality of apertures therethrough, and said body member having a plurality of integral studs extending through the apertures in said housing means, the free ends of said studs being peened over for securely retaining said housing means.

5. A fluid metering device, as defined in claim 4, wherein said housing means includes a viewing opening through which the indicating means may be seen, and said integral studs extending from the body member in the general direction of said viewing opening so that the peened over ends of the studs may be seen by a person looking at the indicating means.

References Cited in the file of this patent

UNITED STATES PATENTS

| 355,821 | Hopkins | Jan. 11, 1887 |
| 684,910 | Colman | Oct. 22, 1901 |
| 1,009,690 | Pletsch | Nov. 21, 1911 |
| 1,922,071 | Bassett | Aug. 15, 1933 |
| 2,147,344 | Horner | Feb. 14, 1939 |
| 2,260,516 | Gerber | Oct. 28, 1941 |

FOREIGN PATENTS

| 54,073 | Germany | Oct. 25, 1890 |
| 352,925 | Great Britain | July 14, 1931 |